July 7, 1959 P. S. CALVO, JR., ET AL 2,893,820
PROCESS FOR THE PRODUCTION OF REGENERATED CELLULOSE FILAMENTS
Filed July 16, 1956
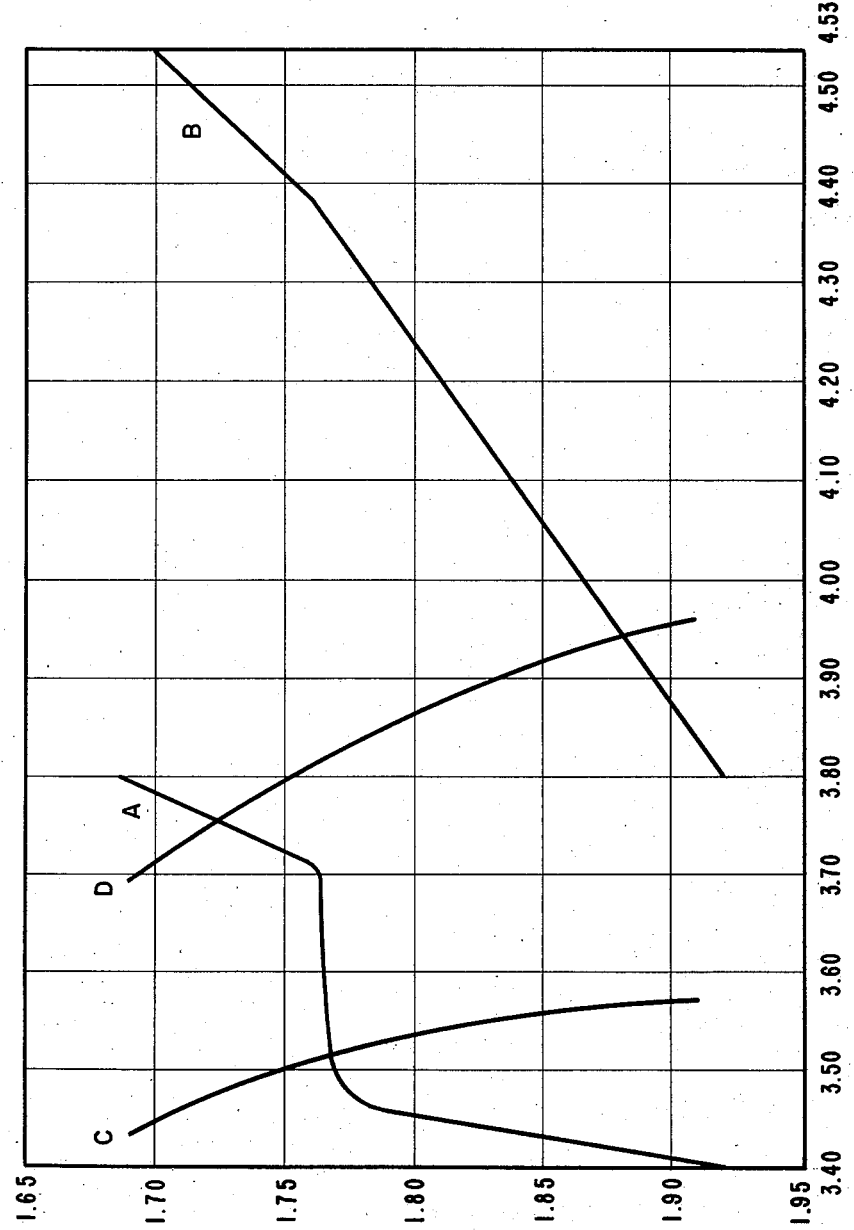
INVENTORS
PHILIP S. CALVO, JR.
WILLIAM C. MOSER
BY *Carl A. Hechmer*
ATTORNEY 2,893,820

PROCESS FOR THE PRODUCTION OF REGEN-
ERATED CELLULOSE FILAMENTS

Philip S. Calvo, Jr., Richmond, Va., and William C. Moser, Seaford, Del., assignors to E. I. du Pont de Nemours and Company, Wilmington, Del., a corporation of Delaware Application July 16, 1956, Serial No. 598,175

5 Claims. (Cl. 18—54)

This invention relates to the manufacture of novel and useful regenerated cellulose structures. More particularly it is concerned with the production of novel high-strength viscose rayon filaments, fibers, yarns and cords.

An object of the present invention is to provide a process for producing a novel regenerated cellulose filament having an excellent combination of transverse and longitudinal properties so that it can be formed into a regenerated cellulose cord having improved tenacity.

Further objects will appear hereinafter.

In accordance with the present invention a novel and useful regenerated cellulose filament is prepared by extruding a viscose into a coagulating and regenerating bath containing an aqueous solution of sulfuric acid and from 10 to 20% by weight, based on the weight of the bath, of a mixture of sodium sulfate and zinc sulfate, the ratio of zinc sulfate to sodium sulfate being at least 0.4 and at least 1.0% sodium sulfate being present, sufficient sulfuric acid being present to provide an acid/alkali factor as defined hereinafter of from 1.0 to 1.76, and there being present during the coagulation and regeneration an organic compound which limits the gel swelling ratio to a value no greater than 0.9. The filament produced by the above process is composed of at least 75% skin, has a lateral order of from 15 to 40, a minimum point in its force versus temperature curve of from 60° C. to 95° C. and a substantially uniform orientation across the filament cross section, the difference in orientation numbers of the center and the outside portion of the filament being no greater than 2.

The figure is a series of curves plotting acid/alkali ratio as ordinate versus tenacities of various cords as abscissa treated in Example I and identified more particularly in that example.

The description of the filament as having a cross-sectional area of at least 75% "skin" indicates that the "shell" or "skin," as contrasted with the central portion or "core," composes at least 75% of filament cross-sectional area. This determination is made according to the technique of Morehead and Sisson reported in "Textile Research Journal," vol. 15, pages 444–445 (1945). In the examples which follow Pontamine yellow dye is substituted for Calcomine yellow used by Morehead and Sisson.

The lateral order of a filament is determined by the expression:

$$\frac{(I_1 - I_m)}{I_1} 100$$

where $I_1$ is the 101 interference intensity and $I_m$ is the minimum intensity between 101 and 101 interferences.

The minimum point in the force versus temperature curve is determined by measuring the change in retractive force when a slightly extended wet filament is held at constant length and subjected to a temperature change ranging from 0° C. to 100° C. The details of this technique are presented by Roseveare and Poore, "Journal of Polymer Science," vol. 14, pages 341–354 (1954).

By an "orientation number" as used herein is intended the difference between the refractive index measured parallel to the fiber axis and the refractive index measured perpendicular to the fiber axis, by interferometric microscopy, the difference being multipled by one thousand. The technique of making the measurements is described by Faust, "Proc. Phys. Soc.," vol. 65B, pages 48–62 (1952).

The acid/alkali factor relates to the ratio of acid in the spinning bath to the alkalinity of the viscose. To obtain the results of this invention with a given viscose, the acidity of the spinning bath must fall within a critical range. This range will, of course, vary with the alkalinity of the viscose, higher viscose alkalinity requiring higher bath acidity and vice versa. Due to the fact that several compounds, in addition to sodium hydroxide, contribute to the measured alkalinity of the viscose, the ratio of bath acidity/viscose alkalinity is not constant. It has been found, however, that for practical purposes, a constant factor is obtained if the bath acidity is divided by the viscose alkalinity minus one per cent. This ratio, percent acidity/(percent alkali−1), is referred to as the acid/alkali factor. Viscose alkalinity is determined by adding an excess of standard sulfuric acid solution, boiling to remove hydrogen sulfide and then titrating with standard sodium hydroxide solution using a suitable indicator such as methyl red. This procedure determines alkali combined as sodium hydroxide, sodium carbonate, sodium trithiocarbonate, sodium sulfide and sodium cellulose xanthate.

The gel swelling ratio reducing organic compounds, which for convenience are termed coagulation modifiers, are present in relatively small amounts, about 0.1 millimole to about 10 millimoles per 100 grams of solution in either the viscose solution, the primary bath, or both. Such agents are well known in the art. The group of compounds which have been found suitable for use in the process of this invention include the following:

A. Quaternary ammonium compounds of the formula

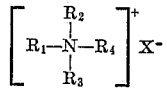

wherein the R's are organic groups which contain no more than four aliphatic carbon atoms, at least three of the said groups containing only aliphatic carbon atoms and the fourth of the said groups containing no more than one phenyl radical, and where X− is an anion having substantially no surface activity. The use of these compounds is disclosed and claimed in U.S. Patent 2,536,014.

B. Aliphatic monoamines having at least four carbon atoms but containing no radical of more than six carbon atoms. The use of these compounds is disclosed and claimed in U.S. Patent 2,535,044.

C. Aliphatic diamines containing two amino nitrogen atoms separated only by carbon atoms and containing a total of at least three carbon atoms, said diamines having the amino groups attached to aliphatic carbon atoms, any monovalent substituent on the amino nitrogens being alkyl groups of 1 to 6 carbon atoms. The use of these compounds is disclosed and claimed in application Serial No. 411,029, filed by N. L. Cox and W. D. Nicoll on February 27, 1954, and British Patent 762,772.

D. The salts of N-substituted dithiocarbamic acids. The use of these compounds is disclosed and claimed in U.S. Patent 2,696,423.

E. The ethers of the formula RO—$(CH_2CH_2O)_nR'$, where R is alkyl or aryl; $n$ is an integer from 1 to 4 inclusive; and R' is hydrogen, alkyl or aryl. The use of these compounds as coagulation modifiers is disclosed and claimed in application Ser. No. 228,979, now abandoned, filed by N. L. Cox on May 29, 1951, and British Patent 741,728.

F. The polyethylene glycols of formula $$HO(CH_2CH_2O)_nH$$

where $n$ is an integer greater than 3. The use of these compounds is disclosed and claimed in application Serial No. 485,285, now abandoned, filed by N. L. Cox on January 31, 1955, and French Patent 1,162,737.

In addition to the above, other compounds which function as coagulation modifiers are described in British Patents 723,435, February 9, 1955, and 730,541, May 25, 1955; and in Belgian Patent 535,699, July 9, 1955.

Gel swelling ratio is the ratio of the gel swelling of the yarn in the presence of a coagulation modifier to that of a yarn spun under similar conditions with no modifier present. Gel swelling is determined by collecting samples of yarn (usually about five grams) on a feed wheel, bobbin or in a spinning bucket. It is then centrifuged in a basket type centrifuge for five minutes at 3600 r.p.m. and thereafter weighed. After washing free of acid and salts the yarn is dried at 100 to 110° C. and weighed again. The weight of the gel (centrifuged) yarn divided by the weight of the dry yarn is referred to as the gel swelling. The ratio of the gel swelling of the yarn spun in the presence of a coagulation modifier to that of a yarn spun under similar conditions with no modifier present is referred to as the gel swelling ratio. Thus, if there is no reduction, the ratio is 1.0 while a 10% reduction gives a ratio of 0.90.

Yarns and cords produced in accordance with this invention exhibit outstanding properties. The cords possess high conditioned tenacity (i.e., the tenacity of a cord which has been conditioned to give a moisture level of 12% by weight) and have a higher ratio of oven-dry to conditioned cord tenacity as well as improved fatigue resistance. Raising of the oven-dry tenacity is important, since in many applications, such as use in automobile tire cord, the cord is more nearly in the oven-dry than in the conditioned cord state. The relationship of cord tenacities in the two states is conventionally expressed numerically as the ratio of oven-dry to conditioned cord tenacity.

The process of the present invention permits operation at commercial rayon spinning speeds (from about 50 to over 100 yards per minute) to produce an exceptionally high quality product whereas previous processes employing coagulation modifiers require reduction to a much lower spinning speed (about 28 yards per minute in Example 1 of U.S. Patent 2,696,423) to produce a product of comparable cord tenacity. Furthermore it permits stretching the yarn during spinning to an extent of about 150% and higher whereas a stretch of about 115% is the maximum when operating in accordance with the prior art.

The following examples are cited to illustrate the invention. They are not intended to limit it in any manner. The "D.B. Fatigue" determinations reported in the examples are made by conditioning a cord for 48 hours at 24° C. and 54% relative humidity, clamping it in jaws set 16.75 inches apart, and thereafter applying a load of 1 gram per denier to the cord. The temperature of the cord is then raised to 100° C. while in place in the machine for about ½ hour. The jaws are thereafter oscillated to stretch the cord 3,000 times per minute using a stroke of 0.24 inch. The fatigue rating of the cord is expressed in terms of the number of minutes elapsed when the cord fails. Other determinations reported in the examples are conventional. All bath components are expressed in terms of percentage by weight of total bath unless otherwise noted. All cords prepared are of the two ply construction containing 11.2 turns S per inch in the singles and 10.8 turns Z in the ply.

EXAMPLE I

Viscoses containing 6.25% recoverable cellulose and 5.75% alkali, calculated as NaOH, are prepared in the conventional manner using 39% carbon disulfide. During mixing sufficient N-methylcyclohexyldithiocarbamate is added to give a concentration of 0.43 millimole per 100 grams of viscose. The viscoses are filtered, deaerated, ripened to a salt index of 16 to 17 and a viscosity of about 32 stokes and are extruded at a temperature of 44° C. into spinning baths having the compositions of Table 1 below. After extrusion the filaments are led through a spinning tube in the bath, converged into yarn and then led around a series of tension rollers and finally out of the bath to a feed wheel. The yarns are given additional stretch by passing them to a second feed wheel having a larger diameter than the first but rotating at the same speed. A hot aqueous solution containing about 2% sulfuric acid is applied to the yarn on both feed wheels. The total stretch between the first bath roller and the last feed wheel is 140%, 43% of the total stretch being applied up to the first feed wheel and 57% between the feed wheels. From the last feed wheel the yarn is passed into a rotating bucket where it is wound into a cake at a final yarn speed of 112 yards per minute. The yarn is then purified, dried, slashed and processed into cord in the conventional manner. Properties of the yarn and cord and other pertinent data are shown in Table 1 below.

Table 1

|  | A | B | C | D |
|---|---|---|---|---|
| Spinning Bath: |  |  |  |  |
| $H_2SO_4$, Percent | 9.1 | 8.5 | 8.35 | 8.05 |
| Acid/Alkali Factor | 1.92 | 1.79 | 1.76 | 1.70 |
| $ZnSO_4$, Percent | 5.0 | 5.0 | 5.0 | 5.0 |
| $Na_2SO_4$, Percent | 11.6 | 11.6 | 11.6 | 11.6 |
| Total Salt, Percent | 16.6 | 16.6 | 16.6 | 16.6 |
| Ratio, $ZnSO_4/Na_2SO_4$ | 0.43 | 0.43 | 0.43 | 0.43 |
| N-Methylcyclohexylamine, Millimoles/100 grams of bath | 1.08 | 1.08 | 1.08 | 1.08 |
| Yarn Properties: |  |  |  |  |
| Denier | 1,650 | 1,650 | 1,682 | 1,655 |
| Denier/Filament | 1.5 | 1.5 | 1.5 | 1.5 |
| Tenacity, g.p.d., dry | 4.50 | 4.77 | 4.71 | 4.87 |
| Tenacity, g.p.d., wet | 2.90 | 3.06 | 3.10 | 3.29 |
| Tenacity, g.p.d., loop | 3.10 | 3.33 | 3.45 | 3.63 |
| Gel Swelling Ratio | 0.84 | 0.83 | 0.84 | 0.82 |
| Cord Properties: |  |  |  |  |
| Denier | 3,728 | 3,732 | 3,795 | 3,736 |
| Tenacity, g.p.d., Conditioned | 3.40 | 3.45 | 3.71 | 3.78 |
| Tenacity, g.p.d., Oven-dry | 3.80 | 4.27 | 4.38 | 4.53 |
| Ratio Oven-dry/Conditioned | 1.12 | 1.23 | 1.18 | 1.20 |
| D. B. Fatigue, Minutes | 200 |  |  | 430 |

As will be evident from a consideration of the figures in the table the only difference in spinning bath compositions among runs A, B, C and D is in the sulfuric acid content, which in turn varies the acid/alkali factor. In runs A and B the acid/alkali factor is high. In runs C and D the acid/alkali factor is within the limits of the present invention. Consideration of the cord properties of runs A, B, C and D shows that a decrease in the acid/alkali factor to a value within the limits of the present invention provides a marked increase in the tenacity of the conditioned cord and especially in the tenacity of the oven-dry cord. The figures show that cords produced in accordance with the present invention possess an unexpectedly high ratio of oven-dry to conditioned cord tenacity in addition to a high conditioned cord tenacity. The effect of the acid/alkali factor upon these properties is particularly evident upon a consideration of the figure. Curve A plots the acid/alkali factor as ordinate against tenacity as abscissa for the various cords whose tenacity is measured in the conditioned state. In curve B the tenacities are measured in the oven-dry state. An abrupt break appears in curve A demonstrating the unexpected improvement resulting when proceeding in accordance with the teachings of the present invention.

The unexpected and unpredictable improvement noted in runs C and D is even more apparent upon consideration of runs E, F and G presented in Table 1a below.

Table 1a

|  | E | F | G |
|---|---|---|---|
| Spinning Bath: |  |  |  |
| H$_2$SO$_4$, Percent | 9.1 | 8.5 | 8.0 |
| Acid/Alkali Factor | 1.91 | 1.79 | 1.69 |
| ZnSO$_4$, Percent | 9.5 | 9.5 | 9.5 |
| Na$_2$SO$_4$, Percent | 17.5 | 17.5 | 17.5 |
| Total Salt, Percent | 27.0 | 27.0 | 27.0 |
| Ratio, ZnSO$_4$/Na$_2$SO$_4$ | 0.70 | 0.70 | 0.70 |
| N-Methylcyclohexylamine, Millimoles/100 grams of bath | 0.21 | 0.21 | 0.21 |
| Cord Properties: |  |  |  |
| Tenacity, g.p.d., Conditioned | 3.57 | 3.53 | 3.43 |
| Tenacity, g.p.d., Oven-dry | 3.96 | 3.85 | 3.69 |
| D.B. Fatigue, Minutes | 332 | 328 | 231 |
| Ratio Oven-dry/Conditioned | 1.12 | 1.09 | 1.08 |
| Operability of Process | good | poor | very poor |

In each of these runs the total salt content of the spinning bath is high, and outside the scope of the present invention. All other spinning bath conditions are maintained constant as indicated. The viscose preparation and spinning are carried out generally as described for the previous runs. 41% carbon disulfide is used in the xanthation step and N-methylcyclohexyldithiocarbamate is added to the viscose to give a concentration of 0.33 millimole per 100 grams of viscose. The yarn has a total denier of 1650 and a filament denier of 2.3. The yarn is stretched 110% during spinning, appreciably higher stretch being impossible. The sulfuric acid content of the spinning bath and therefore the acid/alkali factor is the only variable in these runs. As will be noted from a comparison of the conditioned and oven-dry tenacities and also the ratio of oven-dry to conditioned tenacities, there is a deterioration of cord properties when using the high salt content. This effect is illustrated in the figure with curves C and D, curve C representing the conditioned cord tenacities and curve D plotting the oven-dry cord tenacities.

In addition to a deterioration in cord properties the operability of the process decreases as the acid/alkali factor is reduced using a high salt content bath. Operability is judged by the number of thread breaks, the number of filament wraps on feed reels or bath rollers and the number of broken filaments in the yarn.

EXAMPLE II

Viscoses are prepared as described in Example I except that 41% carbon disulfide and, for runs H, I, J and K, sufficient N-methylcyclohexyldithiocarbamate is added to give a concentration of 0.32 millimole per 100 grams of viscose and that of run K contains no gel modifier. The spinning solutions are heated to a temperature of 50° C. and then spun into 1650 denier 1100 filament yarn through a spinneret having orifice diameters of 0.0025 inch. After extrusion the filaments are treated substantially as described in Example I. A spinning speed of 112 yards per minute is employed. The total stretch upon the yarns in runs H, I and J is 135% while that upon run K is 115%.

Table 2

|  | H | I | J | K |
|---|---|---|---|---|
| Spinning Bath: |  |  |  |  |
| H$_2$SO$_4$, Percent | 7.0 | 6.5 | 8.3 | 6.3 |
| Acid/Alkali Factor | 1.47 | 1.37 | 1.75 | 1.33 |
| ZnSO$_4$, Percent | 6.4 | 4.0 | 7.0 | 6.0 |
| Na$_2$SO$_4$, Percent | 12.9 | 13.0 | 16.0 | 8.6 |
| Total Salt, Percent | 19.3 | 17.0 | 23.0 | 14.6 |
| Ratio, ZnSO$_4$/Na$_2$SO$_4$ | 0.50 | 0.34 | 0.44 | 0.70 |
| N-methylcyclohexylamine, Millimoles/100 grams of bath | 0.31 | 0.31 | 0.30 | None |
| Yarn Properties: |  |  |  |  |
| Denier | 1,656 | 1,656 | 1,650 | 1,648 |
| Tenacity, g.p.d., dry | 4.96 | 4.70 | 4.45 | 4.75 |
| Tenacity, g.p.d., wet | 3.38 | 3.14 | 3.03 | 3.04 |
| Tenacity, g.p.d., loop | 3.62 | 3.51 | 3.52 | 3.21 |
| Gel Swelling ratio | 0.83 | 0.86 | 0.82 | 1.0 |
| Cord Properties: |  |  |  |  |
| Denier | 3,708 | 3,697 | 3,700 | 3,680 |
| Tenacity, g.p.d., Conditioned | 3.70 | 3.57 | 3.50 | 3.39 |
| Tenacity, g.p.d., Oven-dry | 4.43 | 4.23 | 4.20 | 4.09 |
| Ratio, Oven-dry/Conditioned | 1.20 | 1.18 | 1.14 | 1.21 |
| D.B. Fatigue, Minutes | 486 | 250 | 300 | 137 |

The unexpectedly superior properties of yarn and cord (H) prepared in accordance with the present invention as compared with yarn and cord (I)—low ratio of Zn/Na sulfates—(J)—total salt content above 20%—and (K)—no modifier—will be obvious from a comparison of the yarn and cord tenacities, and especially the D.B. fatigues in the table above.

As pointed out previously, a filament produced by the above process is characterized by a lateral order of from 15–40, a minimum point in its force versus temperature curve of 60° C.–95° C., a skin content of at least 75%, and a substantially uniform orientation across the filament cross section, the difference in orientation numbers of the center and the outside portion of the filament being no greater than 2. The following examples illustrate the characteristics of the filaments within the limits defined when proceeding in accordance with the process of the invention.

EXAMPLE III

Various baths within the scope of the invention are used, following the technique of Example I to make yarns and cords. Compositions and conditions used appear below.

Table 3

|  | L | M | N | O | P |
|---|---|---|---|---|---|
| Viscose: |  |  |  |  |  |
| Temperature, °C | 50 | 50 | 50 | 50 | 28 |
| CS$_2$, Percent | 41 | 46 | 46 | 46 | 39 |
| N-methylcyclohexyldithiocarbamate, Millimoles/100 grams of viscose | 0.43 | 0.43 | 0.43 | 0.28 | 0.43 |
| Bath: |  |  |  |  |  |
| H$_2$SO$_4$, Percent | 7.5 | 6.8 | 6.8 | 6.8 | 7.9 |
| Acid/alkali Factor | 1.58 | 1.43 | 1.43 | 1.43 | 1.66 |
| ZnSO$_4$, Percent | 6.0 | 5.0 | 6.4 | 6.0 | 5.0 |
| Na$_2$SO$_4$, Percent | 8.6 | 7.2 | 6.4 | 6.0 | 11.6 |
| Total salt, Percent | 14.6 | 12.2 | 12.8 | 14.6 | 16.6 |
| Ratio, ZnSO$_4$/Na$_2$SO$_4$ | 0.69 | 0.70 | 1.0 | 0.69 | 0.43 |
| N-methylcyclohexylamine, Millimoles/100 grams of bath | 2.1 | 0.67 | 0.67 | 0.67 | 1.06 |
| Temperature | 55 | 55 | 63 | 63 | 59 |
| Spinning Conditions: |  |  |  |  |  |
| Stretch | 135 | 135 | 130 | 151 | 135 |
| Breaking stretch | 160 |  | 170 | 188 |  |
| Speed, yards per minute | 112 | 112 | 112 | 112 | 103 |
| Yarn Properties: |  |  |  |  |  |
| Denier | 1,631 | 1,682 | 1,634 | 1,679 | 1,659 |
| Tenacity, g.p.d., dry | 5.14 | 5.06 | 5.01 | 5.07 | 5.1 |
| Tenacity, g.p.d., wet | 3.47 | 3.47 | 3.39 | 3.37 | 3.50 |
| Tenacity, g.p.d., loop | 3.49 | 3.46 | 3.29 | 3.44 | 3.59 |
| Gel Swelling ratio | 0.80 | 0.83 | 0.84 | 0.85 | 0.84 |
| Force-Temp. Min., °C | 70 | 72 | 68 | 69 | 70 |
| Lateral Order | 30±5 | 30±5 | 30±5 | 30±5 | 30±5 |
| Cross Section, Percent, skin | 90 | 90 | 90 | 90 | 90 |
| Orientation No., skin | 25 | 26 | 26 | 25 | 25 |
| Orientation No., core | 24 | 25 | 25 | 24 | 24 |
| Cord Properties: |  |  |  |  |  |
| Denier | 3,627 | 3,726 | 3,633 | 3,732 | 3,678 |
| Tenacity, g.p.d., Conditioned | 3.89 | 3.79 | 3.66 | 3.67 | 3.83 |
| Tenacity, g.p.d., Oven-dry | 4.66 | 4.60 | 4.51 | 4.60 | 4.59 |
| Ratio, Oven-dry/Conditioned | 1.20 | 1.21 | 1.23 | 1.25 | 1.20 |

For comparative purposes a yarn produced in accordance with the present invention (run Q) is compared with a yarn made in a bath having a high acid/alkali ratio and a high total salt content (run R) and with a yarn made in a prior art bath, i.e., a coagulating non-regenerating bath (run S). In the viscose preparation for runs Q and R the procedure of Example I is followed except for differences noted in the table. Yarn treatment and collection also follows the technique of Example I except that the yarn of run R is stretched a total of only 110% with 65% of the total stretch being applied up to the first wheel and 35% being applied between the wheels.

Table 3a

|  | Q | R | S |
|---|---|---|---|
| Viscose: |  |  |  |
| CS₂ in Xanthation, percent | 38.5 | 39.0 | -------- |
| Recoverable Cellulose, percent | 6.25 | 6.25 | -------- |
| Total Alkali as NaOH, percent | 5.50 | 5.75 | -------- |
| N - Methylcyclohexyldithiocarbamate, Millimoles/100 grams of viscose | 0.36 | 0.43 | -------- |
| Spinning Bath: |  |  |  |
| H₂SO₄, percent | 6.3 | 9.1 | -------- |
| Acid/Alkali Factor | 1.40 | 1.92 | -------- |
| ZnSO₄, percent | 7.0 | 9.5 | -------- |
| Na₂SO₄, percent | 7.0 | 17.5 | -------- |
| Total salt, percent | 14.0 | 27.0 | -------- |
| Ratio, ZnSO₄/Na₂SO₄ | 1.0 | 0.54 | -------- |
| N - Methylcyclohexylamine, Millimoles/100 grams of bath | 2.14 | 0.50 | -------- |
| Spin Stretch, percent | 153 | 110 | -------- |
| Stretch at Break, percent | 163 | 130 | -------- |
| Yarn properties: |  |  |  |
| Denier | 1,685 | 1,657 | 1,100 |
| Denier/Filament | 1.5 | 1.5 | 1.5 |
| Tenacity, g.p.d., dry | 5.46 | 4.70 | 5.60 |
| Tenacity, g.p.d., wet | 3.95 | 3.46 | 3.80 |
| Tenacity, g.p.d., loop | 3.64 | 3.28 | 2.91 |
| Gel Swelling ratio | 0.83 | 0.80 | 1.0 |
| Force-Temp. Min., °C | 72 | 50 | >100 |
| Lateral Order | 30±5 | 30±5 | 50±5 |
| Cross Section, percent, skin | 90 | 90–100 | -------- |
| Orientation No., skin | 26 | 25 | 21 |
| Orientation No., core | 25 | 13 | 21 |
| Cord Properties: |  |  |  |
| Denier | 3,740 | 3,702 | 2,390 |
| Tenacity, g.p.d., Conditioned | 4.08 | 3.70 | 3.36 |
| Tenacity, g.p.d., Oven-dry | 4.75 | 4.13 | 4.0 |
| Ratio Oven-dry/Conditioned | 1.17 | 1.13 | 1.19 |
| D.B. Fatigue, Minutes | 593 | 430 | 3 |

As is evident from the above, operation outside the limits of the present invention results in a low value of force versus temperature minimum for the yarn of run R and a high value of force versus temperature minimum for the yarn of run S. Furthermore the lateral order of the yarn of run S is high.

EXAMPLE IV

This example illustrates the advantages of the process of this invention in the production of yarn by the bobbin process. Runs T and V are within the scope of the present invention. Run U is a comparative control having a high acid/alkali ratio and a high total salt content.

Viscoses containing 5.0% recoverable cellulose and 5.5% alkali, calculated as sodium hydroxide, are prepared in the conventional manner. The amount of carbon disulfide used in xanthation is adjusted in each case to give the total sulfur content indicated in Table 4 below. The viscoses are filtered, deaerated, ripened and extruded at a temperature of 20° C. and a viscosity of about 30 stokes into spinning baths having the compositions indicated. The extruded filaments are passed through a spinning tube, then around a series of tension rollers in the bath and up to a bobbin where the yarn is wound up at a speed of 62 yards per minute. In the case of runs T and U the yarn is passed through the bath for a distance of 140 inches and then to the bobbin without the application of hot secondary bath. Yarn V is passed through the primary bath for a distance of 108 inches and then into a hot secondary bath contained in a small compartment located in the primary bath trough, the hot bath solution being formed by a combination of primary bath carried by the running thread into the secondary bath compartment and steam condensate from the introduction of low pressure steam into the secondary bath. The yarn is immersed in the secondary bath for a distance of about 10 inches and then wound onto a bobbin. It is then purified and subjected to conventional slashing operations. Properties of the yarns and cords obtained in these tests together with other pertinent data are given in Table 4 below.

Table 4

|  | T | U | V |
|---|---|---|---|
| Viscose: |  |  |  |
| Total Sulfur, Percent | 1.40 | 1.42 | 1.66 |
| Salt Index | 11.8 | 11.8 | 15.4 |
| N - Methylcyclohexyldithiocarbamate, Millimoles/100 grams of viscose | 0.24 | 0.17 | 0.24 |
| Spinning Bath: |  |  |  |
| H₂SO₄, percent | 7.3 | 8.9 | 6.8 |
| Acid/alkali Factor | 1.62 | 1.98 | 1.51 |
| ZnSO₄, percent | 5.0 | 8.0 | 5.0 |
| Na₂SO₄, percent | 11.5 | 17.0 | 11.5 |
| Total salt, percent | 16.5 | 25.0 | 16.5 |
| Ratio, ZnSO₄/Na₂SO₄ | 0.43 | 0.47 | 0.43 |
| N - Methylcyclohexylamine, Millimoles/100 grams of bath | 3.0 | 0.86 | 2.7 |
| Temperature, °C | 58 | 63 | 58 |
| Spin Stretch, percent | 82 | 70 | 98 |
| Yarn Properties: |  |  |  |
| Denier | 1,640 | 1,666 | 1,643 |
| Denier/Filament | 1.5 | 1.5 | 1.5 |
| Tenacity, g.p.d., dry | 4.50 | 4.32 | 5.27 |
| Tenacity, g.p.d., wet | 2.85 | 3.05 | 3.60 |
| Tenacity, g.p.d., loop | 3.25 | 3.21 | 3.38 |
| Gel Swelling ratio | 0.83 | 0.81 | 0.83 |
| Force-Temp. Min. °C | 70 | 50 | 72 |
| Lateral Order | 30±5 | 30±5 | 30±5 |
| Cross Section, percent, skin | 90 | 90–100 | 90 |
| Orientation No., skin | 24 | 24 | 25 |
| Orientation No., core | 23 | 13 | 24 |
| Cord Properties: |  |  |  |
| Denier | 3,647 | 3,686 | 3,637 |
| Tenacity, g.p.d., Conditioned | 3.58 | 3.48 | 3.99 |
| Tenacity, g.p.d., Oven-dry | 4.14 | 3.81 | 4.64 |
| Ratio Oven-dry/Conditioned | 1.16 | 1.10 | 1.16 |
| D.B. Fatigue, Minutes | 480 | 400 | 480 |

For comparative purposes an attempt is made to increase the spinning speed of a prior art process (Dietrich, United States Patent 2,696,423). Results obtained by Dietrich process at 28 yards per minute as given in Example I of that patent are shown in column W of Table 4a. When the spinning speed is increased to 100 yards per minute without changing any other conditions of Dietrich Example I, the operability of the process and the properties of the yarn and cord are very poor. In order to correct this situation, a spinning tube is employed and other minor changes in the process are made to improve operability and properties. With these changes the operability is satisfactory but the yarn and cord properties are still below the level obtained at 28 yards per minute as shown in column X. Specifically yarn X is prepared by extruding the viscose at a temperature of 42° C., passing the yarn through a 32-inch spinning tube and around a series of tension rollers for a distance of 100 inches in the primary bath, then passing the yarn from the primary bath into a hot secondary bath containing about 2% sulfuric acid at a temperature of 90° C., thereafter passing the yarn for a distance of 40 inches through the secondary bath, then up to and around a feed wheel where hot secondary bath solution is applied to the yarn and finally to a bobbin where the yarn is wound up at a speed of 100 yards per minute. A total stretch of 90–100% is applied. The viscose and bath compositions are indicated in Table 4a.

Yarn Y, prepared in accordance with this invention, is spun using the same spinning arrangement as with yarn X. The viscose is extruded at a temperature of 45° C. and the yarn is stretched 130%. Other processing conditions employed are shown in Table 4a together with the yarn and cord properties.

Table 4a

|  | W | X | Y |
|---|---|---|---|
| Viscose: |  |  |  |
| Total Sulfur, Percent |  | 1.95 | 1.63 |
| Alkalinity as NaOH, Percent | 6.5 | 6.0 | 5.5 |
| Cellulose, Percent | 5.0 | 5.0 | 5.0 |
| Salt Index | 16.0 | 19.5 | 20.0 |
| N-Methylcyclohexyldithiocarbamate, Millimoles/100 grams of viscose |  | 0.18 | 0.25 |
| Cyclohexyldithiocarbamate, Percent | 0.15 |  |  |
| Spinning Bath: |  |  |  |
| H$_2$SO$_4$, Percent | 9.5 | 10.2 | 7.7 |
| Acid/Alkali Factor | 1.73 | 2.02 | 1.71 |
| ZnSO$_4$, Percent | 10.0 | 9.5 | 5.0 |
| Na$_2$SO$_4$, Percent | 17.0 | 17.2 | 11.5 |
| Total salt, Percent | 27.0 | 26.9 | 16.5 |
| N-Methylcyclohexylamine Millimoles/100 grams of bath |  | 0.5 | 2.8 |
| Yarn Properties: |  |  |  |
| Tenacity, g.p.d., dry | 4.9 | 4.78 | 5.4 |
| Tenacity, g.p.d., wet | 3.32 | 3.31 | 3.6 |
| Tenacity, g.p.d., loop | 3.83 | 3.4 | 3.5 |
| Cord Properties: |  |  |  |
| Tenacity, g.p.d., Conditioned | 4.07 | 3.77 | 4.0 |
| Tenacity, g.p.d., Oven-dry | 4.57 | 3.93 | 4.5 |
| Ratio, Oven-dry/Conditioned | 1.12 | 1.04 | 1.13 |

EXAMPLE V

To illustrate the use of various gel swelling ratio modifiers, viscoses are prepared and spun under the general conditions detailed in Example I. The composition of the viscose and bath and the properties of the yarn and cord obtained are given in Table 5 below. N-methylcyclohexylamine is added to the viscose and bath in preparing yarn $Z_1$ while N-butylaminoethanol is the modifier used for yarn $Z_2$.

Table 5

|  | $Z_1$ | $Z_2$ |
|---|---|---|
| Viscose: |  |  |
| CS$_2$ in xanthation, percent | 39 | 39 |
| Recoverable cellulose, percent | 6.25 | 6.25 |
| Alkali as NaOH, percent | 5.75 | 5.75 |
| Modifier, millimoles/100 grams of viscose | 0.5 | 0.51 |
| Temperature, °C | 50 | 44 |
| Spinning Bath: |  |  |
| H$_2$SO$_4$, percent | 7.5 | 7.0 |
| Acid-Alkali Factor | 1.43 | 1.33 |
| ZnSO$_4$, percent | 6.0 | 6.0 |
| Na$_2$SO$_4$, percent | 8.6 | 8.6 |
| Total Salt, percent | 14.6 | 14.6 |
| Ratio, ZnSO$_4$/Na$_2$SO$_4$ | 0.7 | 0.7 |
| Modifier, millimoles/100 grams of bath | 0.5 | 2.14 |
| Temperature, °C | 55 | 60 |
| Spin Stretch, percent | 140 | 140 |
| Yarn Properties: |  |  |
| Denier | 1,680 | 1,734 |
| Denier/Filament | 1.5 | 1.5 |
| Tenacity, g.p.d., dry | 5.07 | 5.32 |
| Tenacity, g.p.d., wet | 3.40 | 3.77 |
| Tenacity, g.p.d., loop | 3.53 | 3.56 |
| Gel Swelling ratio | 0.83 | 0.82 |
| Force-Temp., Min., °C | 68 | 70 |
| Lateral Order | 30±5 | 30±5 |
| Cross Section, percent, skin | 85–90 | 90 |
| Orientation No., skin | 25 | 25 |
| Orientation No., core | 24 | 24 |
| Cord Properties: |  |  |
| Denier | 3,734 | 3,890 |
| Tenacity, g.p.d., Conditioned | 3.90 | 3.85 |
| Tenacity, g.p.d., Oven-dry | 4.64 | 4.48 |
| Ratio, Oven-dry/Conditioned | 1.19 | 1.17 |
| D.B. Fatigue, Minutes | 450 | 585 |

In addition to the coagulation modifiers shown in the above examples many other compounds are available to reduce the gel swelling ratio of the yarn as previously disclosed. To illustrate their effectiveness yarns are prepared following the general conditions of Example I and using viscoses containing 6.25% recoverable cellulose and 5.75% alkali which viscoses are extruded at a temperature of 50° C. into spinning baths containing 6.5% sulfuric acid, 8.8% sodium sulfate and 6.0% zinc sulfate, the baths having a temperature of 55° C. Samples of yarn are collected on the first feed wheel and the gel swelling ratio determined as previously described. The amount and kind of modifier used in each case and the gel swelling ratios are given in Table 6.

Table 6

| Modifier | Concentration, Millimoles/100 grams bath | | Gel Swelling Ratio |
|---|---|---|---|
|  | Viscose | Bath |  |
| None |  |  | 1.00 |
| Tetrahydroxyethylenediamine | 0.18 | 1.06 | 0.80 |
| Diethylene triamine | 0.49 | 2.4 | 0.79 |
| Benzyl trimethyl ammonium hydroxide | 0.25 | 1.0 | 0.85 |
| Phenoxyethanol | 3.0 | None | 0.87 |
| Polyethylene glycol, M.W. 600 | 0.5 | None | 0.86 |

As previously stated, the novel and useful regenerated cellulose filament of the present invention is prepared by extruding a viscose into a coagulating and regenerating bath containing an aqueous solution of sulfuric acid and from 10 to 20% by weight, based on the weight of the bath, of a mixture of sodium sulfate and zinc sulfate, the ratio of zinc sulfate to sodium sulfate being at least 0.4 and at least 1.0% sodium sulfate being present, sufficient sulfuric acid being present to provide an acid-alkali factor of from 1.0 to 1.76, and there being present during the coagulation and regeneration an organic compound which limits the gel swelling ratio of the yarn formed to a value no greater than 0.9. The process provides (1) spinning stretch, markedly higher than that possible with prior art processes (which leads to higher yarn and cord tenacity), (2) a low primary gel swelling (which contributes to an excellent level of fatigue resistance), (3) a high ratio of oven-dry to conditioned cord tenacity and (4) an unusually high level of properties at commercial spinning speeds.

The filament produced, as previously noted, is composed of at least 75% skin, has a lateral order of from 15 to 40, a minimum point in its force versus temperature curve of from 60° C. to 95° C. and a substantially uniform orientation across the filament cross-section, the difference in orientation numbers of the center and the outside portion of the filament being no greater than 2. These variables are related to the longitudinal properties and particularly to the transverse properties which are of significance in a highly twisted structure. As illustrated in the examples, not only is it important to maintain a high percentage of "skin" to provide excellent properties but the force versus temperature minimum must neither be too low (Examples R and U) nor too high (Example S). Furthermore, the orientation number difference (the characteristic indicating the uniformity of orientation of the polymer chains from the inside to the outside of the filament, i.e., across the filament cross section), between the center and the outside portion of the filament must be kept low (Examples R and U). In addition, lateral order, which relates to the degree and perfection of crystallinity in the filament, must be confined within a definite maximum as recited as well as being above the stated minimum.

The viscose solution for use in the present invention is prepared in the conventional manner using alkali cellulose made by soaking sheets of wood pulp or cotton linters pulp in sodium hydroxide solution. After excess alkali is drained and pressed from the saturated sheets, the resulting alkali cellulose is shredded and aged to provide the desired viscosity in the prepared viscose. The shredded alkali cellulose is thereafter dropped into a rotatable drum, i.e. a barratte, where xanthation occurs.

The alkali cellulose may be completely xanthated in the barratte or partially xanthated in the barratte and partially in the viscose mixer. Splitting xanthation so that part of the xanthation takes place in the barratte and the remainder is accomplished by adding carbon disulfide to the viscose mixer is described in United States application Serial Number 351,592, now Patent No.

2,801,998, to A. Robertson. In either conventional or split xanthation a total of at least 30%, but preferably at least 35% carbon disulfide is used.

The xanthated or partially xanthated alkali cellulose is added to a tank where it is mixed with a measured quantity of dilute aqueous sodium hydroxide solution. The amount of sodium hydroxide solution is sufficient to provide a final viscose solution containing 4–9% recoverable cellulose and 4–8% total alkali calculated as sodium hydroxide. Preferably the viscose composition is kept in the range of 5–7% recoverable cellulose and 5–6.5% alkali.

If a coagulation modifier is to be added to the viscose, it is preferably added to the aqueous sodium hydroxide in the mixing tank before the xanthate is added. Obviously the modifier may be added at other points in the process. If an amine is used in conjunction with split xanthation, i.e. part of the $CS_2$ being added to the mixer, the modifier is preferably added prior to addition of the $CS_2$ to the mixer. The amount of modifiers required to obtain optimum yarn and cord properties will vary depending on the modifier used and the processing conditions employed. At least 0.1 millimole/100 grams will be required and generally no more than 10 millimoles per 100 grams of solution will be necessary. Where the modifier is effective in both the viscose and spinning bath, as in the case of the amines, dithiocarbamates and quaternary ammonium compounds, the amount of modifier in the viscose must be adjusted in proportion to the amount in the bath to give the desired effect. The approximate modifier concentration required may be determined easily by determining the gel swelling at a number of modifier concentrations. The amount of modifier required to just reach the minimum gel swelling obtainable is the approximate amount required. Further adjustments may then be made if necessary to reach an optimum level of properties and operability. If an ether (application Ser. No. 228,979, now abandoned) or polyethylene glycol (application Ser. No. 485,285, now abandoned) is used, the compound should be added to the viscose since these compounds do not appreciably influence coagulation if added to the bath.

The viscose solution is filtered, deaerated and may be permitted to ripen at a temperature of about 18° C. to the desired salt index. It is preferable to restrict ripening and spin the viscose in an unripened or partially ripened state.

Prior to spinning the viscose may be heated by means of a small oil bath heat exchanger placed between the spinning pump and the spinneret. Heating may also be accomplished by other suitable means such as steam, hot water, or coagulating bath; or an electric heating unit may be inserted in the viscose supply line.

The viscose is extruded into a coagulating and regenerating bath maintained at a temperature above 40° C., preferably above 50° C., and containing by weight 10–20% of a mixture of sodium sulfate and zinc sulfate, the ratio of zinc sulfate to sodium sulfate being at least 0.4% and at least 1% sodium sulfate being present, and sulfuric acid, the acid/alkali factor being 1.0 to 1.76. The preferred range for sodium sulfate is 6 to 12%. Although, theoretically, sodium sulfate is not an essential ingredient of the bath, it is impossible from a practical standpoint to operate a process in the absence of this compound since it is formed in considerable quantity by the reaction of the alkali in the viscose with sulfuric acid in the bath preferably the acid/alkali factor should be in the range of 1.20 to 1.76 since at lower levels it is difficult to find conditions which give satisfactory operability of the process.

After extrusion the filaments are preferably led through a spinning tube as described in United States Patent 2,440,057 to F. R. Millhiser. The filaments travel about 25 to 150 inches in the primary bath where they may be confined to a small area by means of a multiple roller arrangement. The rollers are usually designed to apply tension to the yarn in gradual increments while the filaments are still plastic. A preferred method is to apply part of the stretch in a secondary bath consisting of hot water, hot acid solution or hot dilute primary bath at a temperature of 50 to 100° C. This is usually accomplished in the bucket spinning process by placing the secondary bath between two power driven rollers or feed wheels but may also be accomplished by applying the secondary bath to the yarn as it passes around the feed wheels by means of a small jet located above one or both of the feed wheels. The yarn is led from the last feed wheel to a rotating bucket where it is wound into a cake at speeds of 25 to 200 yards per minute. If the yarn is to be collected on a bobbin, feed wheels may be used as just described. However, the more common procedure in bobbin spinning is to lead the yarn from the primary bath into a secondary bath where it is stretched by means of tension rollers. The yarn is led from the secondary bath to the bobbin where it is wound up at speeds of 25 to 200 yards per minute.

A total stretch of 100% or more is usually applied for high tenacity yarns. In processes where feed wheels are used to apply stretch in a secondary bath stretches of 120 to 160% are preferred. In the bobbin process where stretch in the secondary bath is applied without feed wheels, the degree of stretching is limited by the build-up of tension on the thread as stretch is increased since with too high a tension the bobbin may collapse as the yarn shrinks in subsequent purification. Stretches in this latter process are preferably kept in the range of 85 to 115%. Lower stretches may of course be used in processes for producing textile yarn. The cake or bobbin is purified and dried by conventional methods. In the case of high tenacity yarn the yarn is usually subjected to a slashing operation which consists of stretching the yarn while immersed in a hot bath containing a suitable lubricating agent and then drying without relaxation. In addition to the bucket and bobbin processes, any of the so-called continuous processes may be used to produce the regenerated cellulose products of this invention.

The novel filaments produced by the process of this invention have been described. When they are formed into cords, outstanding cord tenacities are obtained. These filaments are particularly desirable for use in the tire cord industry because of the unique combination of longitudinal and transverse properties, but they have outstanding merits for any purpose where regenerated cellulose fibers are finding applications, such as in the textile industry.

Many apparent modifications will be apparent to those skilled in the art from a reading of the above description without a departure from the inventive concept.

What is claimed is:

1. A process for the production of a regenerated cellulose filament which comprises extruding a viscose into a coagulating and regenerating bath containing an aqueous solution of sulfuric acid and from 10 to 20% by weight, based on the weight of the bath, of a mixture of sodium sulfate and zinc sulfate, the ratio of zinc sulfate to sodium sulfate being at least 0.4 and at least 1.0% sodium sulfate being present, sufficient sulfuric acid being present to provide an acid/alkali factor of from 1.0 to 1.76 and there being present during the coagulation and regeneration an organic coagulation modifier which limits the gel swelling ratio to a value no greater than 0.9.

2. The process of claim 1 wherein the sodium sulfate content of the bath is from 6 to 12%.

3. The process of claim 1 wherein the acid/alkali factor is within the range of from 1.20 to 1.76.

4. The process of claim 1 wherein the viscose is extruded at a temperature of at least 40° C.

5. A process for the production of a regenerated cellulose filament which comprises extruding a viscose into a coagulating and regenerating bath containing an aqueous solution of sulfuric acid and from 10 to 20% by weight, based on the weight of the bath, of a mixture of sodium sulfate and zinc sulfate, the ratio of zinc sulfate to sodium sulfate being at least 0.4 and at least 1.0% sodium sulfate being present, sufficient sulfuric acid being present to provide an acid/alkali factor of from 1.0 to 1.76 and there being present during the coagulation and regeneration an organic coagulation modifier which limits the gel swelling ratio to a value no greater than 0.9, and thereafter applying a total stretch of at least 100% to the regenerated filament.

References Cited in the file of this patent

UNITED STATES PATENTS

| | | |
|---|---|---|
| 2,535,044 | Cox | Dec. 26, 1950 |
| 2,612,679 | Ladisch | Oct. 7, 1952 |
| 2,674,025 | Ladisch | Apr. 6, 1954 |
| 2,732,279 | Tachikawa | Jan. 24, 1956 |
| 2,777,505 | Pedlow | Dec. 25, 1956 |
| 2,787,517 | Lekkerkerker | Apr. 2, 1957 |

UNITED STATES PATENT OFFICE

CERTIFICATE OF CORRECTION

Patent No. 2,893,820                    July 7, 1959

Philip S. Calvo, Jr., et al

It is hereby certified that error appears in the printed specification of the above numbered patent requiring correction and that the said Letters Patent should read as corrected below.

Column 1, line 65, for "101 and 101" read -- 101 and $\overline{101}$ --.

Signed and sealed this 17th day of November 1959.

(SEAL)
Attest:

KARL H. AXLINE
Attesting Officer

ROBERT C. WATSON
Commissioner of Patents